(12) United States Patent
Berney

(10) Patent No.: US 8,172,476 B2
(45) Date of Patent: May 8, 2012

(54) SWIVEL HOOK TIE DOWN

(75) Inventor: Brian J. Berney, Keller, TX (US)

(73) Assignee: ED Tucker Distributor, Inc., Fort Worth, TX (US)

( * ) Notice: Subject to any disclaimer, the term of this patent is extended or adjusted under 35 U.S.C. 154(b) by 913 days.

(21) Appl. No.: 12/110,134

(22) Filed: Apr. 25, 2008

(65) Prior Publication Data

US 2009/0265901 A1    Oct. 29, 2009

(51) Int. Cl.
*F16D 3/00* (2006.01)

(52) U.S. Cl. .......................... 403/164; 403/78

(58) Field of Classification Search .................. None
See application file for complete search history.

(56) References Cited

U.S. PATENT DOCUMENTS

| | | | |
|---|---|---|---|
| 760,171 A * | 5/1904 | Atwell | 24/310 |
| 765,812 A | 7/1904 | Carlson | |
| 1,889,633 A | 11/1932 | Butterworth | |
| 2,193,291 A * | 3/1940 | Marchins | 59/95 |
| 2,400,291 A * | 5/1946 | D Aleo | 59/95 |
| D249,327 S | 9/1978 | Gaines | |
| 4,224,722 A * | 9/1980 | Mikosz et al. | 24/601.5 |
| 4,274,252 A * | 6/1981 | Cavender | 59/86 |
| 4,577,374 A | 3/1986 | Lii | |
| D308,627 S | 6/1990 | Guffey | |
| D337,935 S | 8/1993 | Hawley | |
| 5,253,396 A | 10/1993 | Rekuc et al. | |
| D342,665 S | 12/1993 | Rekuc | D8/367 |
| 5,274,887 A | 1/1994 | Fudaki | |
| 5,365,642 A | 11/1994 | Rekuc et al. | |
| 5,398,389 A | 3/1995 | Terada et al. | |
| 5,438,736 A | 8/1995 | Terada et al. | |
| 5,450,661 A | 9/1995 | Rekuc | |
| 5,475,901 A | 12/1995 | Anscher | |
| D375,889 S | 11/1996 | Miller et al. | |
| 5,671,514 A | 9/1997 | Matoba et al. | |
| D413,252 S | 8/1999 | Striebel | D8/367 |
| D413,789 S | 9/1999 | Striebel | |
| 6,550,413 B2 | 4/2003 | Fiorentino et al. | |
| 6,694,574 B1 | 2/2004 | Sheng | |
| D491,049 S | 6/2004 | Kung | D8/367 |
| D496,251 S | 9/2004 | Buscart | D8/356 |
| D500,244 S | 12/2004 | Yoshiguchi | |
| D565,392 S | 4/2008 | Shetler | D8/356 |
| 7,353,571 B2 | 4/2008 | Goldberg | 24/599.6 |
| D583,654 S | 12/2008 | Uehara | |
| 2006/0179784 A1 | 8/2006 | Chen | |
| 2006/0248686 A1 | 11/2006 | Cook | |
| 2007/0193005 A1 * | 8/2007 | Chalk | 24/265 H |
| 2008/0022497 A1 | 1/2008 | Thompson | 24/598.1 |

OTHER PUBLICATIONS

International Search Report in PCT Patent Application No. PCT/US2009/037086, dated May 5, 2009.
Written Opinion of the International Search Authority in PCT Application No. PCT/US2009/37086, dated May 5, 2009.

* cited by examiner

*Primary Examiner* — Jack W. Lavinder
(74) *Attorney, Agent, or Firm* — Gardere Wynne Sewell, LLP

(57) ABSTRACT

A swivel coupling is provided for connecting a multi-piece restraint having two trapezoidally shaped segments capable of rotating with respect to each other. Each segment includes rectangular and multiple cylindrical portions with one being orthogonal to the segment and having an orifice for receiving a connecting means to join the segments. In another embodiment, one segment is joined to an attachment having a hook that includes a base portion and a hook portion where the base portion includes an orthogonal cylindrical portion having an orifice for receiving a connecting means that extends through the orifice and through the second orifice of the segment.

8 Claims, 6 Drawing Sheets

SWIVEL HOOK TIE DOWN

BACKGROUND OF THE INVENTION

Cargo is often restrained or secured using lengths of materials often referred to as "tie-downs" that are in turn connected to the container, for instance, such as a truck, trailer and the like. Conventional tie-downs are characterized by having a single continuous section of material that may be referred to as a strap with securing means at each end for connection between the cargo and the container. In use, conventional tie-downs twist as cargo moves or as the securing means is tightened, for instance, in the case where strap tension may be adjusted with the securing means attached to the cargo or container. As the strap twists, it begins to kink which diminishes the speed by which cargo may be fastened and unfastened. Accordingly, it is to overcome the disadvantages of conventional tie-downs that the present invention has been developed.

SUMMARY OF THE INVENTION

A swivel coupling for connecting a multi-piece restraint is disclosed herein having trapezoidally shaped segments having orthogonal cylindrical portions through which a connecting means joins the segments for rotatable movement. Also disclosed herein is a swivel hook coupled to a segment as mentioned above for connecting a restraint to an article.

Those skilled in the art will further appreciate the above-mentioned advantages and superior features of the invention, together with other important aspects thereof upon reading the detailed description which follows in conjunction with the drawings.

DETAILED DESCRIPTION OF A PREFERRED EMBODIMENT

Figure 1:
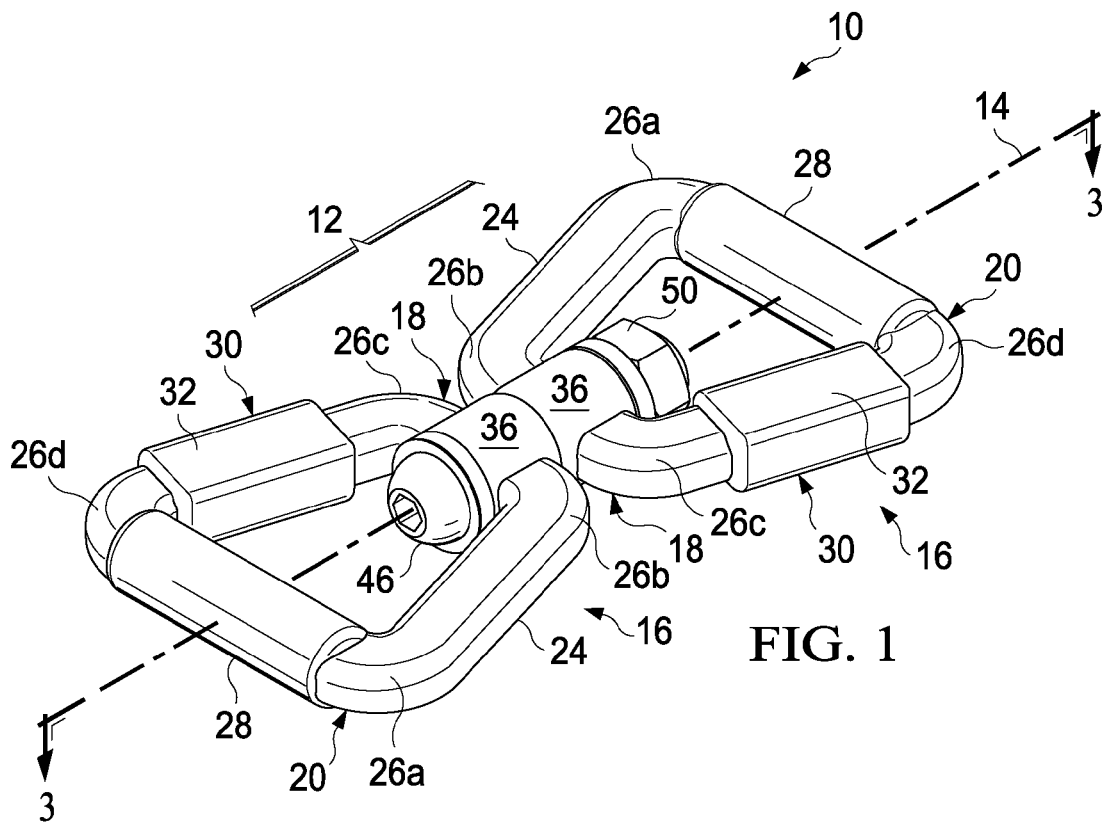
FIG. 1 is a perspective view of a swivel coupling.

In the description which follows like parts are marked throughout the specification and drawing with the same reference numerals, respectively. The drawing figures may not necessarily be to scale and certain features may be shown in generalized or somewhat schematic form in the interest of clarity and conciseness.

Referring to FIG. 1, there is illustrated a swivel coupling 10 having two substantially identical "loop" or segment portions 16 connected by a linkage portion 12 that is rotatable about an axis 14 that coincides with the overall axis of the coupling 10. Further describing a loop or segment 16 of the coupling, segment 16 has a substantially trapezoidal configuration or backbone with a short end 18 and a long end 20, with the two ends 18 and 20 connected by first 22 and second side 24 portions, and the ends and sides are connected via shoulder portions 26a-d to form the overall substantially trapezoidal shape having a generally planar configuration as reflected by the X-Z plane referred to by numeral 34 in FIG. 2. In one embodiment, the shoulders 26a-d are curved, and the loops 16 are integrally formed, for example by casting, although they may be formed separately and attached together by suitable means such as by welding.

Figure 7A:
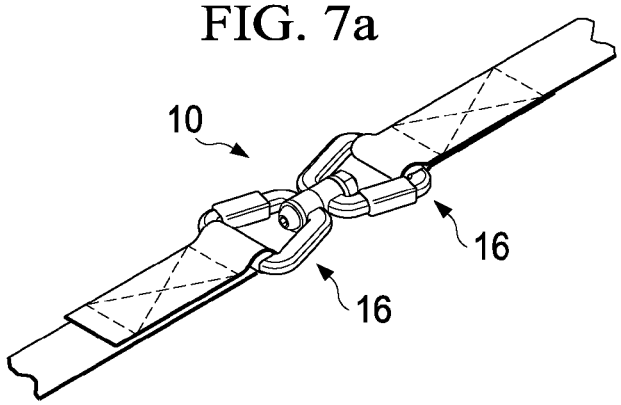
FIG. 7a shows the swivel coupling shown in FIG. 1 connecting two straps with the coupling segments oriented in the same plane.
Figure 7B:
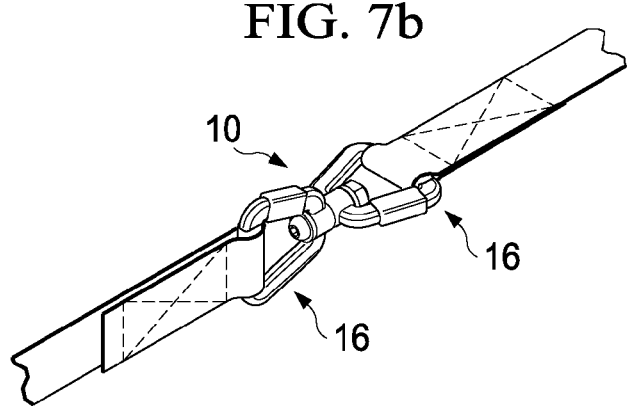
FIG. 7b shows the swivel coupling of FIG. 7a with the coupling segments oriented in different planes to prevent the restraining straps from twisting.

With continuing reference to FIG. 1, the long end 20 includes a cylindrical portion 28 about its extent about which a strap (as shown in FIGS. 7a and 7B) may be fastened. The first side portion 22 includes a rectangular-like portion 30 having top 32 and bottom (not shown) surfaces, that is, top and bottom with respect to plane 34 with reference to the overall shape of the loop 16. Top and bottom surfaces of rectangular-like portion 30 provide areas for the placement of design and labels, etc., as well as functioning to reinforce the structure and/or provide a gripping area by a user. The second side portion 24 shown in the figures does not include a rectangular-like portion, although embodiments are envisioned with neither side portion having a rectangular-like portion, or alternatively, both having side portions. Additionally, although other configurations are contemplated, the trapezoidal segment 16 includes multiple planar surfaces extending longitudinally along the length of the segment in the areas between cylindrical portion 28, rectangularly shaped portion 30, orthogonal cylindrical portion 36, such as shoulders 26a-d and sides 22 and 24, as shown in FIG. 1. In another embodiment, it is contemplated that a bar extending parallel to long end 20 and between first and second sides 22 and 24 may be provided to improve the strength of the segments and/or to prevent an attached restraining strap from bunching to one side within the internal area of the segment.

Figure 3:
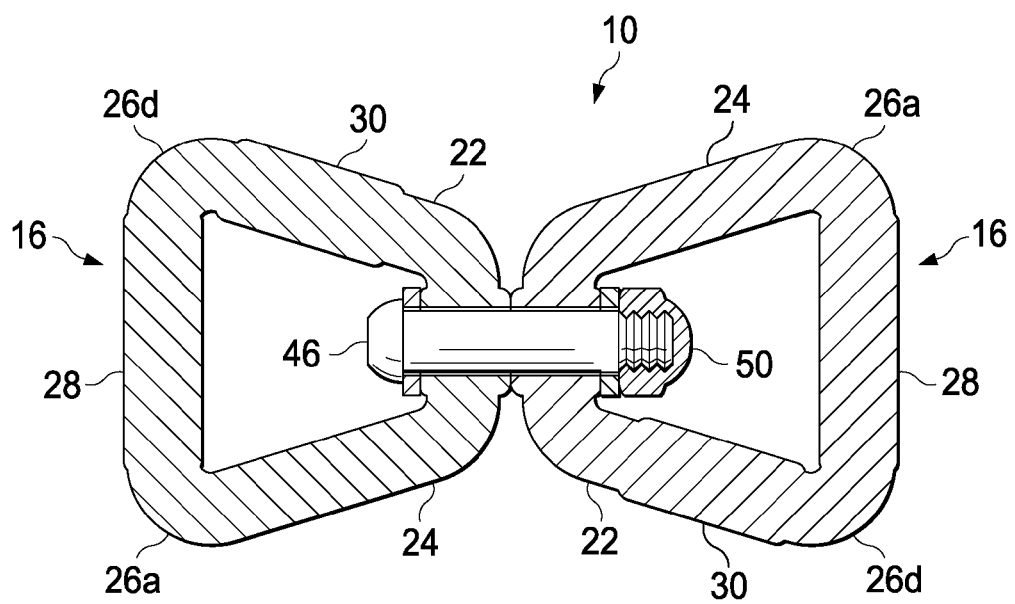
FIG. 3 is a cross-sectional view of the swivel coupling of FIG. 1 along line 3-3.
Figure 2:
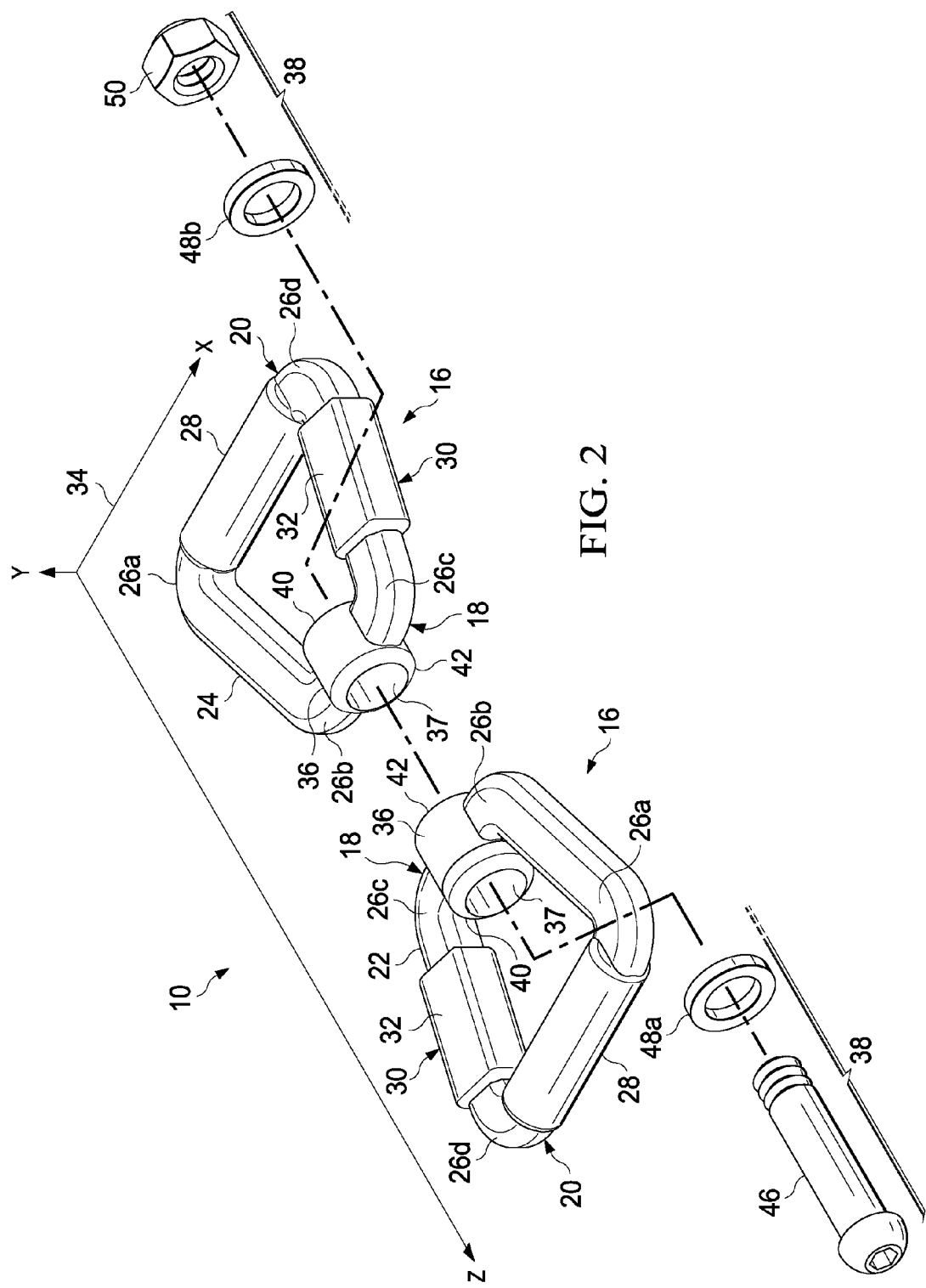
FIG. 2 is an exploded view of the swivel coupling of FIG. 1.

FIGS. 1 through 3, with particular emphasis on FIG. 2, shows that the short end 18 includes along its length a cylindrical portion 36 that is orthogonal to the extent of the short end 18. The cylindrical portion 36 includes an orifice 37 for receiving connecting means 38 for coupling segments 16 and has an inner end 40 and an outer end 42 with respect to the inner area formed by the loop segment.

FIGS. 1 through 3 illustrate the connecting means or linkage 38 of the loop portions 16. As shown, threaded bolt 46 connects loops via orifices 37 in short ends 18, respectively, and may include washers 48a and 48b on the respective inner ends 40 of cylindrical portions 36, with bolt 46 secured by a securing means such as the threaded nut 50 as shown.

Figure 4:
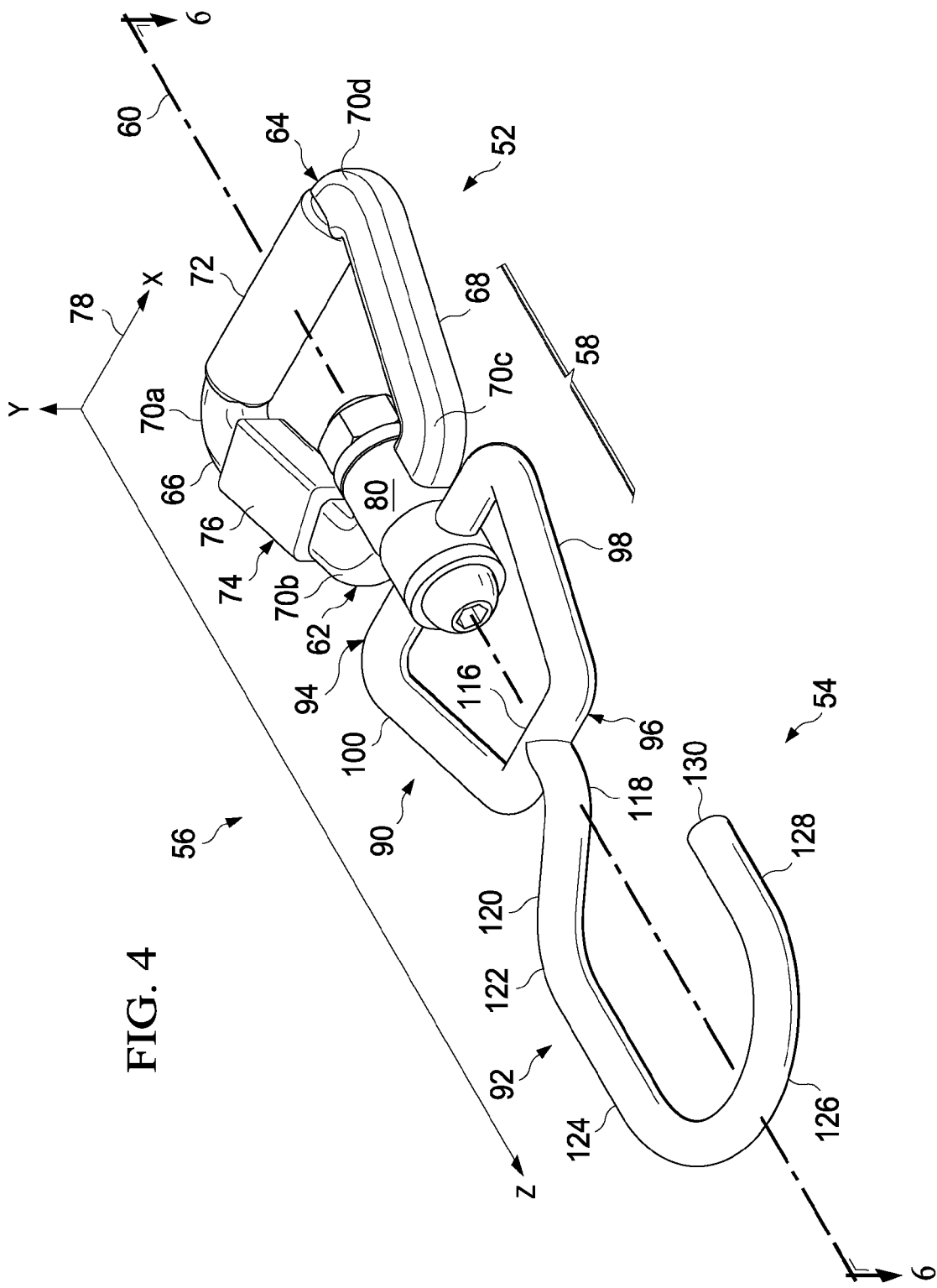
FIG. 4 is a perspective view of modification of the swivel coupling of FIG. 1 showing a hook attachment.

FIGS. 4-6, 8A, and 8B show a swivel loop segment 52 with an attachable swivel hook portion 54 forming a swivel coupling 56. With particular reference to FIG. 4, the swivel loop segment 52 and the swivel hook portion 54 are connected by a linkage portion 58 that is rotatable about an axis that is substantially parallel to the overall axis 60 of coupling 56. Segment 52 has a substantially trapezoidal configuration with a short end 62 and a long end 64, with the two ends connected by first and second side portions 66 and 68, and the ends and sides are connected via shoulder portions 70a-d to form the overall substantially trapezoidal shape. In a preferred embodiment, the shoulders are curved, and the loops are integrally formed, for example by casting, although they may be formed separately and attached together by suitable means such as by welding. Additionally, although other configurations are contemplated, the trapezoidal segment 52 includes multiple planar surfaces extending longitudinally along the length of the segment in the areas between cylindrical portion 72, rectangularly shaped portion 74, orthogonal cylindrical portion 80, such as shoulders 70a-d and sides 66 and 68, as shown in FIG. 4. In another embodiment, it is contemplated that a bar extending parallel to long end 64 and between first and second sides 66 and 68 may be provided to improve the strength of the segments and/or to prevent an attached restraining strap from bunching to one side within the internal area of the segment.

The long end 64 includes a cylindrical portion 72 about which a strap (shown in FIGS. 8a and 8B) may be fastened. In one embodiment (not shown), one or both sides may include a rectangular-like portion akin to that shown for the swivel loop segment 52 indicated by reference numeral 74.

Figure 5:
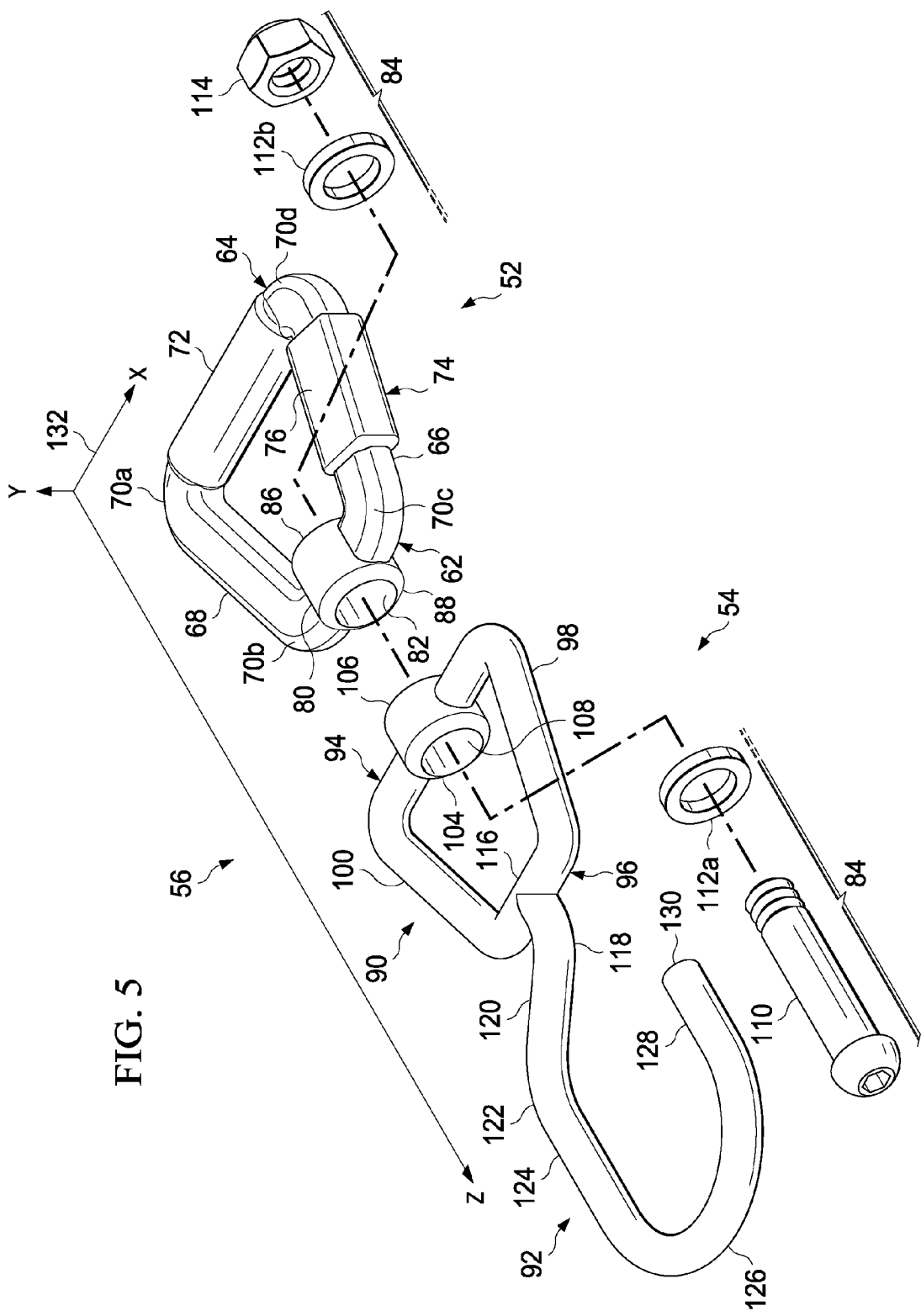
FIG. 5 is an exploded view of the coupling of FIG. 4 showing the connection assembly.
Figure 6:
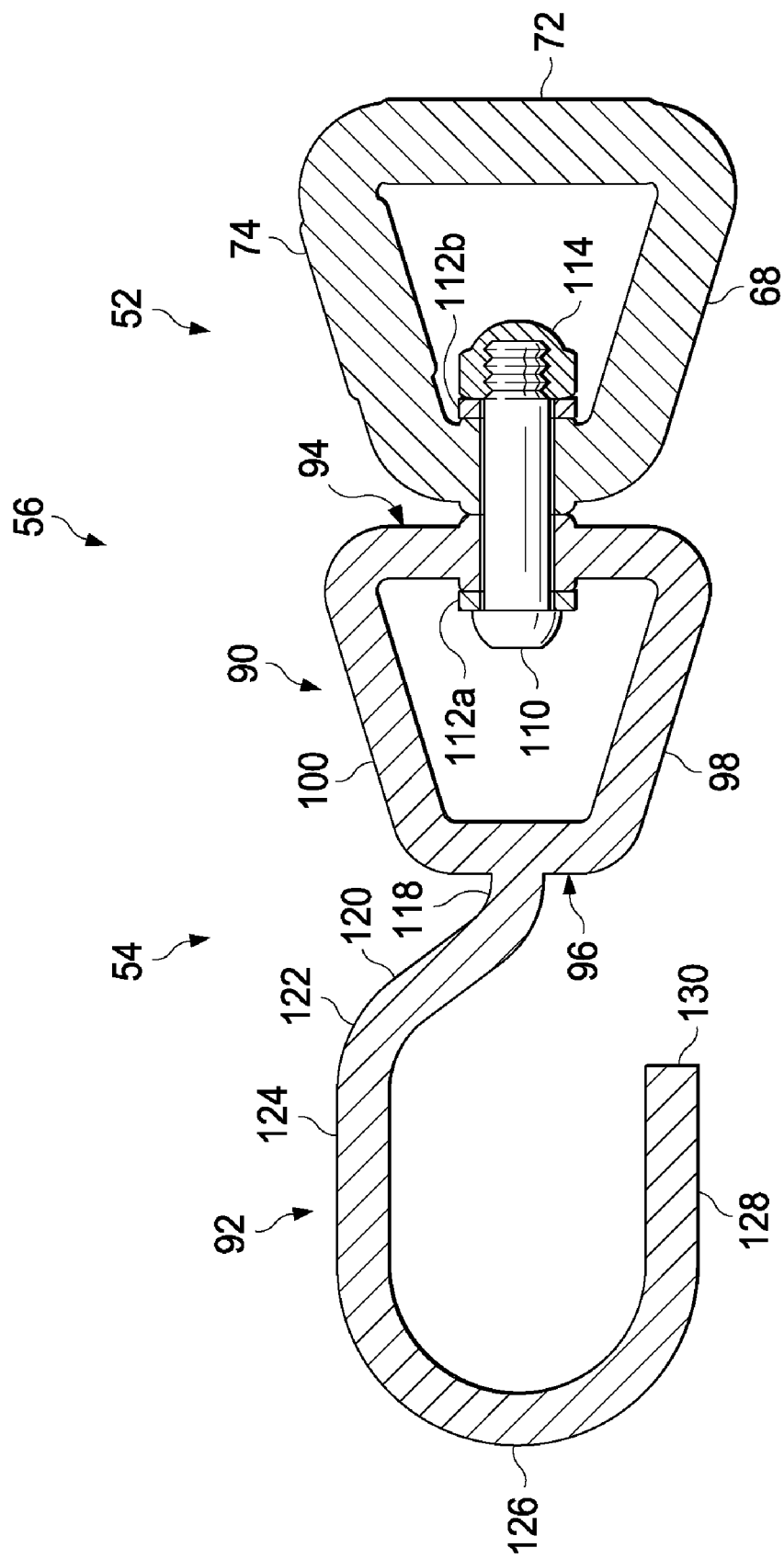
FIG. 6 is a cross-sectional view of the swivel coupling shown in FIG. 4 along line 6-6.

FIGS. 4 through 6, with particular emphasis on FIG. 5, shows that the short end 62 includes along its length a cylindrical portion 72 that is orthogonal to the extent of the short end 62. The cylindrical portion 72 includes an orifice 82 (shown in FIG. 5) that receives a connecting means 84 for linking the loops and has an inner end 86 and an outer end 88 with respect to the inner area formed by the loop segment 52.

The hook attachment 54 comprises a base portion 90 and a hook portion 92. The base portion 90 has a long end 94, short end 96, and substantially similar first and second sides 98 and 100. The long end 94 includes an orthogonal cylindrical portion 102 having an inner end 104 and an outer end 106 with an orifice 108 therebetween having a diameter that is substantially the same as the orifice 82 of the orthogonal cylindrical portion 80 of the loop segment 52 described above wherein connecting means 84 extends therethrough. The connecting means 84 is as described above and includes, for instance, a threaded bolt 110, washers 112a,b and threaded nut 114, as shown in FIG. 5 however the bolt may be inserted through the inner end of the orthogonal cylindrical portion of the loop segment or through the inner end of the cylindrical portion of the hook attachment base (as shown), with the threaded nut mated with the threaded portion of the bolt as known to one of ordinary skill and with the washers positioned as indicated.

With respect to the hook portion 54, From the approximate midpoint represented generally by reference numeral 116 along the length of the short end 96 depends hook portion 92 that in one embodiment extends at an acute angle with respect to the short end (not shown). As shown in FIGS. 4-6 and 8a and 8b, the hook portion 54 depends at an angle approximately normal to that of the short end 96 with a slight outward curvature 118 that transitions to a first straight portion 120, a first shoulder 122, a second straight portion 124, then a curved or substantially semicircular portion 126 that terminates in a third straight portion 128 that is substantially parallel to the second straight portion 124 with its end 130 terminating at or near the plane transverse to the point where the first shoulder 122 transitions to the second straight portion 124. It is also contemplated in another embodiment that the hook attachment include a carabiner-type closure between end 130 and short end 96 and/or side 98.

Referring now to FIGS. 7a and 7b, the swivel embodiment discussed previously in reference to FIGS. 1-3 is shown in context of restraining straps or so-called "tie-downs". FIG. 7a shows the swivel coupling having restraining straps fastened to each loop, respectively, with FIG. 7b showing the rotation of a strap relative to the other that is permitted by the swiveled coupling effectively eliminating twisting that would occur with a single strap without the coupling.

Figure 8A:
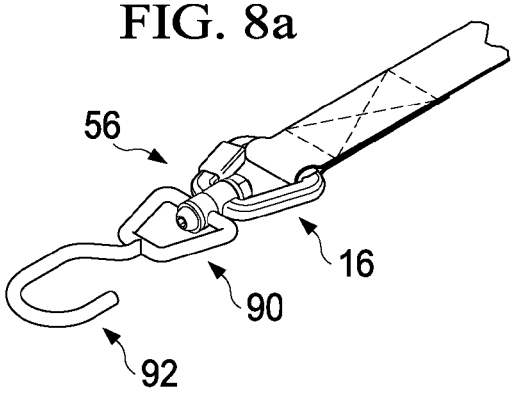
FIG. 8a shows the swivel hook coupling shown in FIG. 4 with the hook attachment oriented in the same plane as the segment.
Figure 8B:
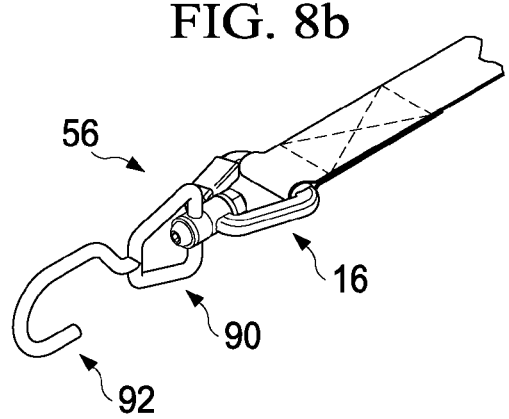
FIG. 8b shows the swivel coupling of FIG. 8a with the hook attachment oriented in a different plane than the segment to prevent the restraining strap from twisting.

Referring to FIGS. 8a and 8b, the swivel hook embodiment shown in FIG. 8a show the hook portion, loop segment and the strap are coplanar and FIG. 8b shows the hook portion is somewhat orthogonal to the loop segment and the strap indicating its rotation.

Although a preferred embodiment of the invention together with a description of its operation has been set forth hereinabove, those skilled in the art will appreciate that various substitutions and modifications may be made without departing from the scope and spirit of the appended claims.

straight portion 124 with its end 130 terminating at or near the plane transverse to the point where the first shoulder 122 transitions to the second straight portion 124. It is also contemplated in another embodiment that the hook attachment include a carabiner-type closure between end 130 and short end 96 and/or side 98.

Referring now to FIGS. 7a and 7b, the swivel embodiment discussed previously in reference to FIGS. 1-3 is shown in context of restraining straps or so-called "tie-downs". FIG. 7a shows the swivel coupling having restraining straps fastened to each loop, respectively, with FIG. 7b showing the rotation of a strap relative to the other that is permitted by the swiveled coupling effectively eliminating twisting that would occur with a single strap without the coupling.

Referring to FIGS. 8a and 8b, the swivel hook embodiment shown in FIG. 8a show the hook portion, loop segment and the strap are coplanar and FIG. 8b shows the hook portion is somewhat orthogonal to the loop segment and the strap indicating its rotation.

Although a preferred embodiment of the invention together with a description of its operation has been set forth hereinabove, those skilled in the art will appreciate that various substitutions and modifications may be made without departing from the scope and spirit of the appended claims.

What is claimed is:

1. A swivel coupling for connecting a multi-piece restraint comprising:
    trapezoidally shaped first and second segments each having a short side disposed opposite a long side, and a first side disposed opposite a second side, said first and second sides spanning between said short and long sides, respectively,
    wherein said segments have multiple planar surfaces extending longitudinally along the length of said segments and said long sides each having a cylindrical portion, the first side includes a rectangularly shaped portion and the short side includes a cylindrical portion that is orthogonal to the short side and having an orifice extending therethrough, and
    a connecting means for connecting said first and second segments by extending through said orifices to secure said first and second segments to form said swivel coupling.

2. The swivel coupling of claim 1, wherein:
    said rectangularly shaped portion includes beveled corners.

3. The swivel coupling of claim 2, wherein:
    said rectangularly shaped portion is enlarged with respect to the first side.

4. The swivel coupling of claim 1, wherein:
    said orthogonal cylindrical portion orifices of said first segment and said second segment, respectively, have equal diameters.

5. The swivel coupling of claim 1, wherein:
said cylindrical portion of said first segment long side has a diameter lesser than the diameter of said orthogonal cylindrical portion of said first segment.

6. The swivel coupling of claim 5, wherein:
said cylindrical portion of said first segment long side has a diameter lesser than the diameter of said orthogonal cylindrical portion of said second segment.

7. A swivel hook for connecting a restraint to an article comprising:
a trapezoidally shaped segment having a short side, a long side, a first side and a second side, said first and second sides spanning between said short and long sides, respectively,
wherein said segment includes multiple planar surfaces extending longitudinally along the length of said segment and said long side having a cylindrical portion, the first side includes a rectangularly shaped portion and the short side includes a cylindrical portion that is orthogonal to the short side and having an orifice extending therethrough;
a releasably attachable swivel hook portion having a base portion and a hook portion, said base portion including trapezoidally shaped loop portion having a short side, a long side, and first and second sides spanning between said long and short sides, respectively, wherein said long side includes an orthogonal cylindrical portion having an orifice extending therethrough, and said hook portion extending from said short side of said base portion; and
a connecting means for connecting said segment and said attachable swivel hook portion by extending through said segment orthogonal cylindrical portion orifice and said attachable swivel hook base cylindrical portion orifice to form said swivel coupling.

8. A swivel hook for connecting a restraint to an article comprising:
a trapezoidally-shaped first segment having a short side disposed opposite a long side and a first segment side disposed opposite a second segment side, said first and second segment sides spanning between said short and long sides, respectively,
wherein said short side includes a cylindrical portion that is orthogonal to the short side and having an orifice extending therethrough;
a releasably attachable swivel hook portion having a tapezoidally-shaped base portion and a hook portion, said base portion including a short base side, a long base side, and first and second base sides spanning between said long and short base sides, respectively, wherein said long base side includes an orthogonal cylindrical portion having an orifice extending therethrough, and said hook portion extending from said short base side of said base portion; and
a connecting means for connecting said segment and said attachable swivel hook portion by extending through said segment orthogonal cylindrical portion orifice and said attachable swivel hook base cylindrical portion orifice to form said swivel coupling.

* * * * *